UNITED STATES PATENT OFFICE.

H. A. LONGSDORF AND D. E. LONGSDORF, OF MECHANICSBURG, PA.

IMPROVED PAINT.

Specification forming part of Letters Patent No. 55,510, dated June 12, 1866.

*To all whom it may concern:*

Be it known that we, H. A. LONGSDORF and D. E. LONGSDORF, of Mechanicsburg, in the county of Cumberland and State of Pennsylvania, have invented a new and Improved Paint Compound; and we do hereby declare that the following is a full, clear, and exact description thereof, which will enable others skilled in the art to fully understand and make use of the same.

This invention relates to a new compound to be used as a paint where cheapness and durability are the principal objects desired, which paint can be applied to outside work as a protection against the action of the atmospheric elements, or as a cheap substitute for the ordinary frescoing of inside walls.

The several ingredients of the paint compound embraced in the present invention, as well as the proportions and the manner in which they are mixed together, are as follows, viz: lime, fifty parts; caseine, twenty-five parts; alum, six parts, each of which ingredients are to be well and thoroughly pulverized, when, being then mixed together, the compound is then to be diluted with thick milk sufficient to reduce it to a proper consistency for being applied with an ordinary paint-brush to any desired surface.

Before compounding the several ingredients herein above recited the lime should be slaked with sufficient water to leave it in a fine dry powdered state, after which it should be sifted through a fine sieve in order to remove all coarse and foreign particles or substances from it.

The caseine used is obtained from the curd of milk, which should be subjected to a gentle heat for a sufficient length of time to separate the whey from the curd, that should be placed in a canvas or other suitable bag, and the whey allowed to drain off for about twenty-four hours without subjecting it to any pressure.

Before applying the paint compound composed of the ingredients above named it should be well stirred, so as to thoroughly mix its several ingredients together.

We claim as new and desire to secure by Letters Patent—

The compound composed of the ingredients herein named and mixed together in or about the proportions described, for the purpose specified.

The above specification of our invention signed by us this 25th day of April, 1866.

H. A. LONGSDORF.
D. E. LONGSDORF.

Witnesses:
JOSEPH LEAS,
R. WILSON.